United States Patent Office 3,505,280
Patented Apr. 7, 1970

3,505,280
POLYOXYMETHYLENE STABILIZED WITH MIXTURES OF A UREIDE ACID SALT AND PHENOL
Hans-Dieter Hermann, Edgar Fischer, and Ernst Wolters, Frankfurt am Main, Germany, assignors to Farbwerke Hoechst Aktiengesellschaft vormals Meister Lucius & Brüning, Frankfurt am Main, Germany, a corporation of Germany
No Drawing. Filed Nov. 27, 1967, Ser. No. 685,970
Claims priority, application Germany, Dec. 2, 1966, F 50,819
Int. Cl. C08g 51/58, 51/60
U.S. Cl. 260—45.8                 9 Claims

ABSTRACT OF THE DISCLOSURE

Stabilization of high molecular weight polyoxymethylenes which may contain in the main valence chain oxyalkylene units with 2 to 6 contiguous carbon atoms by mixtures of alkaline earth metal salts of acids having a ureide structure and phenols.

---

High molecular weight polyoxymethylenes to be used for making shaped structures must be subjected to various stabilizing processes. It is known that the unstable semiacetal chain ends of the polymers can be prevented from decomposing by esterification or etherification. The decomposition starting at the chain end can most effectively be suppressed by incorporating stable comonomer units into the polymer chain.

In addition, stabilizers must be added to the polymers. Antioxidants such as phenols or aromatic amines protect the polymers against the attack of oxygen. A satisfactory stabilization can only be obtained, however, when besides antioxidants other stabilizers are present which block decomposition of the polymer at high temperatures.

A large number of stabilizers of this type is known. There are particularly mentioned urea compounds, thiourea compounds and hydrazine compounds, amidines, urethanes, amides of polybasic carboxylic acids, polyamides and vinyl polymers having nitrogen-containing groups. In combination with phenols some of these stabilizers exhibit a very good effect, especially when used for stabilizing copolymers of trioxane.

It has not been possible, however, to develop stabilizer combinations which do not have at least one of the following disadvantages:

(1) Discoloration of the stabilized polymer after processing,
(2) Discoloration of the polymer after storage at elevated temperature,
(3) Embrittlement of the polymer after storage at elevated temperature,
(4) Discoloration of the polymer after storage in hot water,
(5) Diffusion of the stabilizer out of the polymer after storage at room temperature or elevated temperature,
(6) Difficulty in blending the stabilizer homogeneously with the polymer.

It has been proposed to use free barbituric acids, allophanic acid esters or cyanic acids as stabilizers for polyoxymethylenes. The stabilizing effect of the said compounds is, however, unsatisfactory at temperatures above 220° C. in the presence of air.

It has now been found that polyoxymethylenes can advantageously be stabilized when as stabilizers there are used mixtures of 0.01 to 3% calculated on the weight of the polymer, of alkaline earth metal salts of acids having a ureide structure and 0.1 to 4%, calculated on the weight of the polymer, of a phenol. The total concentration of the stabilizer combination in the polymer shall not exceed 5% by weight.

Suitable stabilizers are, for example, magnesium, calcium, strontium and barium salts of barbituric acid, diethylbarbituric acid, allophanic acid, and cyanuric acid, the calcium, strontium and barium salts being preferred.

It is surprising that the aforesaid salts have a much better stabilizing effect than other salts of, for example, barbituric acid and cyanuric acid and that their stabilizing effect by far exceeds that of other derivatives of the said acids, for example their esters and that they have a lower tendency to discoloration. The combinations according to the invention can be used with special advantage to stabilize copolymers of trioxane having in the main valence chain oxalkylene groups with 2 to 6 contiguous carbon atoms and a reduced viscosity of 0.2 to 2.0 determined with a 0.5% solution in butyrolactone at 140° C. in the presence of 2% of diphenylamine.

The aforesaid salts have an optimum stabilizing effect when they are applied together with phenols. Suitable phenols are especially those which carry substituents in ortho and para-position with respect to the hydroxyl group, for example 2,6-dimethyl-4-tert.butylphenol. Especially suitable are bisphenols, for example 2,2'-methylene-bis(4-methyl-6-tert.butylphenyl) or polyphenols such as the condensation product of 4-tert.butylphenol and formaldehyde.

The concentration of the stabilizers to be applied depends in the first place on the type of the polymer to be stabilized. Homopolymers of formaldehyde or trioxane mostly require higher stabilizer concentrations than copolymers. In general, the salts according to the invention are used in a concentration in the range of from 0.01 to 3% by weight, preferably 0.03 to 0.5% by weight, and the phenols are used in an amount of from 0.1 to 4% by weight, preferably 0.2 to 2% by weight. The total concentration of the stabilizer combination in the polymer shall not exceed, however 5% by weight.

The polymers to be stabilized can be produced by any method, for example by polymerization of formaldehyde or its cyclic oligomers. Especially suitable are copolymers of trioxane carrying in the main valence chain oxalkylene groups with 2 to 6 contiguous carbon atoms. The polymers may contain 0.1 to 50% by weight of oxalkylene groups. Copolymers of this type can be readily obtained, for example, by cationic copolymerization of trioxane with cyclic ethers, cyclic acetals or linear polyacetals. Comonomers that are especially suitable for the manufacture of the copolymers are ethylene oxide and its derivatives, oxacyclobutanes and cyclic formals, for example of glycol, 1,3-butane-diol and 1,4-butane-diol, diethylene-glycol or 1,4-butent-diol(2), or liquor polyformals from aliphatic and cycloaliphatic diols and formaldehyde.

The polymers must have a high molecular weight, that is to say they must have a reduced viscosity of 0.2 to 2.0 determined with a 0.5% solution of the polymer in butyrolactone at 140° C. in the presence of 2% of diphenylamine. It is advantageous to use polymers having a reduced viscosity in that range of from 0.5 to 1.5. It is desirable that the polymers have a certain minimum stability prior to the stabilization process. When heated for 30 minutes at 200° C. they should not lose more than 80% of their weight. The stabilizers according to the invention have the advantage that they can be homogeneously blended with the powdery polymer by simple mechanical mixing. They can also be applied to the polymer in any other manner.

To obtain an optimum stability the polmer must have stable terminal groups, i.e. terminal groups that have been esterified or etherified. When copolymers of trioxane are used the stabilization of the terminal groups and the addition of the stabilizers can be performed in one stage, for example by kneading the polymer at 170 to 220° C. in the presence of the stabilizers, whereby the unstable polymer portions escape in the form of formaldehyde.

In some cases it may be desirable to incorporate into the polymers further stabilizers, pigments, glass fibers or other fillers.

The stabilized polymers can be used for making filaments, films, tubes, profiles and injection moulded articles.

The following examples serve to illustrate the invention but they are not intended to limit it thereto; the percentages are by weight unless otherwise stated.

EXAMPLE 1

A copolymer of trioxane and 4% of 1,3-dioxolane having stable terminal groups was intimately mixed by mechanical stirring with 0.75% of a condensation product of p-tert.butylphenol and formaldehyde and the stabilizers indicated in the following table. The loss in weight of the samples was then determined after heating them for 45 minutes at 230° C. in air. The table reveals that the effect of the stabilizers according to the invention is at least equal to that of the comparative substances marked by (+).

Stabilizer: 0.1% of—     Loss in wt. after 45 min. at 230° C. in air
- Calcium barbiturate _____ 0.82
- Strontium barbiturate _____ 0.73
- Barium barbiturate _____ 0.78
- Ultramid 1C® (polyamide of Badische Anilin und Sodafabrik) (+) _____ 0.83
- Dicyndiamide (+) _____ 0.90
- 1,1-ethylene-bis-imidazolidone(2) (+) _____ 0.78
- Adipic acid dihydriazide (+) _____ 1.01
- Barbituric acid (+) _____ 3.50

EXAMPLE 2

A copolymer of trioxane and 2% of ethylene oxide was mixed with 0.5% of 4,4'-butylidene-bis(6-tert.butyl-3-methylphenol) and 0.1% of barium cyanurate. The polymer was injection moulded at 210° C. In contradistinction to polymers containing, instead of the barium salt, 0.1% of allophanic acid ester or 0.1% of Ultramid 1C®, the shaped articles made from the copolymer stabilized according to the invention exhibited a very slight discoloration only after a storage for 10 days at 120° C. in air.

EXAMPLE 3

Pipes made by extrusion from acetylated polyformaldehyde stabilized with 0.2% of calcium allophanate and 0.7% of 2,2'-methylene-bis(4-methyl-6-tert.butylphenol) did practically not change their colour after being kept for 10 days at 120° C. When heated for 45 minutes at 230° C. in air samples of the pipes lost 2.1% of their weight.

EXAMPLE 4

Directly after granulation and heating for 30 minutes at 230° C. in a closed mould a copolymer of trioxane and 2% of ethylene oxide containing 0.5% of 2,2'-methylene-bis(4-methyl-6-tert.butylphenol) and each time 0.1% of costabilizer was made into mouldings having a thickness of 3 mm. and a diameter of 4.5 cm. Simultaneously, mouldings were made directly from the granules without pretreatment at 230° C. and kept for 10 days at 120° C. in air. The yellow colorations caused by the different treatments were defined as $$\sqrt{(x-x_0)^2+(y-y_0)^2}$$

of the colour value portions $x$, $x_0$, $y$, $y_0$, determined in a trichromatic colorimeter according to DIN 5033. The following table clearly shows the superiority of the stabilizers of the invention over the known stabilizers marked by (+). The samples stabilized with cyanurates and barbiturates had the best degradation and discoloration values.

| Costabilizer | Loss in weight, 45 minutes, 230° C., air | Colour of mouldings (yellow coloration) | | |
|---|---|---|---|---|
| | | Without heat treatment | 10 days at 120° C. | 30 minutes at 230° C. |
| Strontium cyanurate | 0.73 | −2 | 10 | 5 |
| Strontium barbiturate | 0.72 | −1 | 21 | 7 |
| Barium cyanurate | 0.80 | −2 | 16 | 3 |
| Dicyandiamide (+) | 0.90 | −1 | 25 | 25 |
| Zytel 61 ® (polyamide of DuPont) (+) | 0.93 | −1 | 28 | 24 |
| Stearylguanidine (+) | 2.40 | 3 | 68 | >70 |
| 2-heptadecylimidazoline (+) | 1.60 | 11 | >70 | >70 |

What is claimed is:

1. Polyoxymethylene having incorporated therein as a stabilizer a mixture of 0.01 to 3% by weight of at least one alkaline earth metal salt of a ureide acid containing 2 or 3 nitrogen atoms and 0.1 to 4% by weight of a phenol, the percentages being based on the weight of polymer and the stabilizer concentration not exceeding 5% by weight.

2. Polyoxymethylene having incorporated therein as a stabilizer a mixture of 0.01 to 3% by weight of a calcium, strontium or barium barbiturate, cyanurate or allophanate or mixtures thereof and 0.1 to 4% by weight of an ortho- and para-substituted phenol, the percentages being based on the weight of the polymer and the total stabilizer concentration not exceeding 5% by weight.

3. Stabilized polyoxymethylene according to claim 2 wherein the phenol is a condensation product of p-tertiary butylphenol and formaldehyde and the alkaline earth metal salt is calcium, strontium or barium barbiturate.

4. Stabilized polyoxymethylene according to claim 2 wherein the phenol is 4,4'-butylidene-bis(6-tert.butyl-3-methylphenol) and the alkaline earth metal salt is barium cyanurate.

5. Stabilized polyoxymethylene according to claim 2 wherein the phenol is 2,2'-methylene-bis(4-methyl-6-tert.butylphenol).

6. Stabilized polyoxymethylene according to claim 5 wherein the alkaline earth metal salt is calcium allophanate.

7. Stabilized polyoxymethylene according to claim 5 wherein the alkaline earth metal salt is strontium cyanurate.

8. Stabilized polyoxymethylene according to claim 5 wherein the alkaline earth metal salt is strontium barbiturate.

9. Stabilized polyoxymethylene according to claim 5 wherein the alkaline earth metal salt is barium cyanurate.

References Cited

UNITED STATES PATENTS

| | | | |
|---|---|---|---|
| 3,281,392 | 10/1966 | Oddo et al. | 260—45.8 |
| 3,316,206 | 4/1967 | Hermann et al. | 260—45.8 |
| 3,324,125 | 6/1967 | Senda et al. | 260—257 |
| 3,392,184 | 7/1968 | Ulrich et al. | 260—455 |

DONALD E. CZAJA, Primary Examiner

R. A. WHITE, Assistant Examiner

U.S. Cl. X.R.

260—45.85, 45.9, 45.95